United States Patent
Nagai et al.

(10) Patent No.: US 9,768,446 B2
(45) Date of Patent: Sep. 19, 2017

(54) NON-AQUEOUS ELECTROLYTE SECONDARY BATTERY

(71) Applicant: TOYOTA JIDOSHA KABUSHIKI KAISHA, Toyota-shi, Aichi (JP)

(72) Inventors: Hiroki Nagai, Ama-gun (JP); Takumi Tamaki, Nisshin (JP); Hiroshi Onizuka, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 168 days.

(21) Appl. No.: 14/408,733

(22) PCT Filed: Apr. 30, 2013

(86) PCT No.: PCT/JP2013/062660
§ 371 (c)(1),
(2) Date: Dec. 17, 2014

(87) PCT Pub. No.: WO2014/002611
PCT Pub. Date: Jan. 3, 2014

(65) Prior Publication Data
US 2015/0207147 A1 Jul. 23, 2015

(30) Foreign Application Priority Data
Jun. 29, 2012 (JP) ................. 2012-147825

(51) Int. Cl.
*H01M 4/58* (2010.01)
*H01M 10/0567* (2010.01)
*H01M 10/0568* (2010.01)
*H01M 10/058* (2010.01)
(Continued)

(52) U.S. Cl.
CPC ....... *H01M 4/5825* (2013.01); *H01M 4/0445* (2013.01); *H01M 4/1393* (2013.01);
(Continued)

(58) Field of Classification Search
CPC combination set(s) only.
See application file for complete search history.

(56) References Cited

U.S. PATENT DOCUMENTS

| 6,506,516 B1 * | 1/2003 | Wietelmann | C07F 5/04 |
| | | | 423/277 |
| 2010/0035147 A1 * | 2/2010 | Kotato | H01M 10/052 |
| | | | 429/203 |

(Continued)

FOREIGN PATENT DOCUMENTS

| JP | 2007-165125 A | 6/2007 | |
| JP | 2007-250288 A | 9/2007 | |
| JP | 2011-034893 A | 2/2011 | |
| JP | 2011-082033 A | 4/2011 | |
| JP | 2011-96643 A | 5/2011 | |
| JP | 2012-109239 A | 6/2012 | |
| JP | WO 2012108270 A1 * | 8/2012 | ............ H01M 4/587 |

OTHER PUBLICATIONS

Machine translation of Fujiwara (JP 2007-250288 A).*
Formal translation of Fujiwara (JP 2007-250288 A1).*

*Primary Examiner* — Imran Akram
(74) *Attorney, Agent, or Firm* — Sughrue Mion, PLLC (57) ABSTRACT

This invention provides a method for producing a non-aqueous electrolyte secondary battery. The method comprises constructing a battery cell that comprises a positive electrode comprising a positive electrode active material, a negative electrode comprising a negative electrode active material, and a non-aqueous electrolyte solution comprising a non-aqueous solvent and an oxalatoborate-based compound. The method further comprises charging the battery cell to form on the negative electrode a layer that is derived from the oxalatoborate-based compound and comprises boron and oxalate ions. The method further comprises carrying out a modification treatment to increase the ratio of number of moles $m_B$ of boron to number of moles $m_A$ of oxalate ions in the layer.

4 Claims, 2 Drawing Sheets (51) Int. Cl.
  *H01M 4/1393* (2010.01)
  *H01M 4/36* (2006.01)
  *H01M 10/0525* (2010.01)
  *H01M 4/04* (2006.01)
  *H01M 10/04* (2006.01)
  *H01M 4/133* (2010.01)
  *H01M 4/505* (2010.01)
  *H01M 4/525* (2010.01)
  *H01M 4/02* (2006.01)

(52) U.S. Cl.
  CPC ........... *H01M 4/366* (2013.01); *H01M 10/04* (2013.01); *H01M 10/058* (2013.01); *H01M 10/0525* (2013.01); *H01M 10/0567* (2013.01); *H01M 10/0568* (2013.01); *H01M 4/133* (2013.01); *H01M 4/505* (2013.01); *H01M 4/525* (2013.01); *H01M 2004/027* (2013.01); *H01M 2220/20* (2013.01); *Y02T 10/7011* (2013.01); *Y10T 29/49108* (2015.01)

(56) References Cited

U.S. PATENT DOCUMENTS

| | | | |
|---|---|---|---|
| 2010/0099031 A1* | 4/2010 | Kato | H01M 10/052 429/330 |
| 2012/0156557 A1* | 6/2012 | Kotato | H01M 10/052 429/200 |
| 2012/0244425 A1 | 9/2012 | Tokuda | |
| 2012/0264010 A1* | 10/2012 | Kato | H01M 10/052 429/200 |
| 2013/0202955 A1* | 8/2013 | Yawata | H01M 10/052 429/188 |
| 2013/0216919 A1* | 8/2013 | Tokuda | H01M 10/052 429/329 |
| 2013/0224578 A1* | 8/2013 | Sawa | H01M 10/0525 429/200 |
| 2013/0252093 A1 | 9/2013 | Yokomizo et al. | |
| 2013/0330609 A1* | 12/2013 | Sawa | H01M 4/587 429/200 |

* cited by examiner

NON-AQUEOUS ELECTROLYTE SECONDARY BATTERY

CROSS REFERENCE TO RELATED APPLICATIONS

This application is a National Stage of International Application No. PCT/JP2013/062660 filed Apr. 30, 2013, claiming priority based on Japanese Patent Application No. 2012-147825, filed Jun. 29, 2012, the contents of all of which are incorporated herein by reference in their entirety.

TECHNICAL FIELD

The present invention relates to a lithium secondary battery. In particular, it relates to a lithium secondary battery applicable to a power supply installed in a vehicle.

The present application claims priority based on Japanese Patent Application No. 2012-147825 filed on Jun. 29, 2012, and the entire content thereof is incorporated herein by reference.

BACKGROUND ART

Lithium-ion secondary batteries and other non-aqueous electrolyte secondary batteries have become increasingly important as power supplies installed in vehicles or as batteries for PCs and mobile devices, etc. In particular, for their abilities to provide high energy density while being lightweight, lithium-ion secondary batteries are suitable as high-power power supplies installed in vehicles.

In a non-aqueous electrolyte secondary battery such as lithium-ion secondary battery and the like, components (e.g. a supporting electrolyte, non-aqueous solvent) in the non-aqueous electrolyte solution may partially decompose during charging to form a layer (solid electrolyte interphase layer, or "SEI layer" hereinafter) on the surface of the negative electrode active material. The SEI layer may comprise a layer of an organic substance such as $ROCO_2Li$ (R is an organic group), etc., or a layer of an inorganic substance such as $LiF$, $Li_2O$, etc. Such an SEI layer may be formed in excess when the battery is stored in a charged stated or when charging and discharging are repeated, possibly resulting in increased negative electrode resistance and giving rise to issues of decreased battery performance.

To deal with such problems, it has been suggested to include various additives in non-aqueous electrolyte solutions used in fabricating secondary batteries. For example, Japanese Patent Application Publication Nos. 2011-34893 and 2007-165125 disclose non-aqueous electrolyte solutions comprising oxalatoborate-based compounds (e.g. lithium bis(oxalate)borate).

CITATION LIST

Patent Literature

[Patent Document 1] Japanese Patent Application Publication No. 2011-34893
[Patent Document 2] Japanese Patent Application Publication No. 2007-165125

SUMMARY OF INVENTION

Technical Problem

A secondary battery using a non-aqueous electrolyte solution comprising an oxalatoborate-based compound may have greater durability as compared to a secondary battery using a non-aqueous electrolyte solution free of the compound. For instance, during storage in a charged state or repeated charging and discharging, the increase in the negative electrode resistance can be made smaller. It is considered that such effects can be obtained such that during initial charging of the secondary battery the oxalatoborate-based compound decomposes to form a layer on the negative electrode active material, preventing an excessive development of SEI layer derived from the supporting electrolyte or non-aqueous solvent on the layer.

On the other hand, the layer formed by decomposition of the oxalatoborate-based compound is a resistor by itself. Thus, there has been a tendency that a secondary battery using a non-aqueous electrolyte solution comprising an oxalatoborate-based compound initially exhibits higher negative electrode resistance as compared to a secondary battery using a non-aqueous electrolyte solution free of the compound.

An objective of the present invention is to provide a non-aqueous electrolyte secondary battery wherein the negative electrode exhibits a low initial resistance and an increase in the negative electrode resistance with use is suppressed. Another related objective is to provide a method for producing such a non-aqueous electrolyte secondary battery.

Solution to Problem

After a layer derived from an oxalatoborate-based compound was formed on a negative electrode, the present inventors tried to modify the layer. They discovered that by suitable modification of the layer, a non-aqueous electrolyte secondary battery comprising the modified layer could be made such that the negative electrode comprising the layer exhibited a low initial resistance and an increase in the resistance with use was effectively suppressed.

The present invention provides a method for producing a non-aqueous electrolyte secondary battery. The production method comprises constructing a battery cell that comprises a positive electrode comprising a positive electrode active material, a negative electrode comprising a negative electrode active material, and a non-aqueous electrolyte solution comprising a non-aqueous solvent and an oxalatoborate-based compound. The production method further comprises charging the battery cell to form a layer derived from the oxalatoborate-based compound (hereinafter, a layer derived from an oxalatoborate-based compound may be referred to as an "OB layer") on the negative electrode. The OB layer comprises boron (B) and oxalate ions. The production method further comprises carrying out a modification treatment of the OB layer. The modification treatment may increase the ratio ($m_B/m_A$ ratio) of number of moles $m_B$ of boron contained to number of moles $m_A$ of oxalate ions contained.

According to the production method, after the OB layer is formed on the negative electrode by charging the battery cell, by subjecting the OB layer to the modification treatment, the resistance in the negative electrode comprising the OB layer can be reduced. This allows production of a non-aqueous electrolyte secondary battery such that the negative electrode exhibits a low initial resistance and an increase in the negative electrode resistance with use is effectively suppressed. The low resistance in the negative electrode is preferable as it may contribute to increase the input and output performance of the battery, etc.

Another non-aqueous electrolyte secondary battery production method provided by the present invention comprises constructing a battery cell that comprises a positive electrode comprising a positive electrode active material, a negative electrode comprising a negative electrode active material, and a non-aqueous electrolyte solution comprising a non-aqueous solvent and an oxalatoborate-based compound. The production method also comprises charging the battery cell to form a layer derived from the oxalatoborate-based compound (OB layer) on the negative electrode. The production method further comprises subjecting the battery cell to an aging treatment in which the battery cell is stored at or above a temperature of 60° C. in an at least 65% state of charge (SOC). Such an aging treatment can efficiently modify the OB layer and effectively reduce the resistance in the negative electrode having the OB layer. The aging treatment can be preferably carried out by storing the battery cell at or above a temperature of 60° C. in a state where the battery cell satisfies at least either an SOC not lower than 82% or a voltage not lower than 3.9 V.

Although not particularly limited, the OB layer modification is preferably carried out so that the $m_B/m_A$ ratio in the OB layer is at least 1.2 times (more preferably at least 1.5 times, e.g. at least 2 times) that before the modification. The OB layer modification is preferably carried out so as to yield an $m_B/m_A$ ratio value of 3 or higher (e.g. an $m_B/m_A$ ratio value of 3 to 15).

In a preferable embodiment, as the non-aqueous electrolyte solution used for constructing the battery cell, a non-aqueous electrolyte solution comprising the oxalatoborate-based compound at a concentration $Mc_B$ of 0.015 mol to 0.5 mol per kilogram of the non-aqueous electrolyte solution (i.e. 0.015 mol/kg to 0.5 mol/kg) is used. According to a non-aqueous electrolyte solution having such a composition, an OB layer effective in suppressing an increase in the negative electrode resistance caused by battery use can be formed on the negative electrode.

In another preferable embodiment, the non-aqueous electrolyte solution used for constructing the battery cell comprises a difluorophosphate salt in addition to the oxalatoborate-based compound. According to a non-aqueous electrolyte solution having such a composition, by the effects of the difluorophosphate salt, dissolution of transition metal(s) from the positive electrode active material can be suppressed. The dissolution of the transition metal(s) may be forwarded by carrying out the OB layer modification treatment. Thus, the use of a non-aqueous electrolyte solution comprising an oxalatoborate-based compound and a difluorophosphate salt in combination is particularly meaningful.

When the non-aqueous electrolyte solution comprises a difluorophosphate salt, the difluorophosphate salt concentration $Mc_P$ may suitably be, for example, 0.05 mol/kg to 1.0 mol/kg. In an embodiment where the non-aqueous electrolyte solution used for constructing the battery cell comprises an oxalatoborate-based compound and a difluorophosphate salt, the difluorophosphate salt concentration $Mc_P$ can be 1.5 times to 5 times the oxalatoborate-based compound concentration $Mc_B$.

The art disclosed herein can be preferably applied to a non-aqueous electrolyte secondary battery comprising as a positive electrode active material a lithium transition metal oxide containing manganese (Mn) as a constituent metal (a Mn-containing lithium transition metal oxide). It is particularly meaningful to apply the embodiment where the non-aqueous electrolyte solution used for constructing the battery cell comprises a difluorophosphate salt in addition to an oxalatoborate-based compound to a non-aqueous electrolyte secondary battery comprising a Mn-containing lithium transition metal oxide as a positive electrode active material.

The present invention provides a non-aqueous electrolyte secondary battery that comprises a positive electrode comprising a positive electrode active material, a negative electrode comprising a negative electrode active material, and a non-aqueous electrolyte solution. The negative electrode comprises a layer (OB layer) derived from an oxalatoborate-based compound. The OB layer comprises boron and oxalate ions. The OB layer has a ratio ($m_B/m_A$ ratio) of number of moles $m_B$ of boron to number of moles $m_A$ of oxalate ions of 3 to 15. A non-aqueous electrolyte secondary battery having such a constitution may be made such that the negative electrode exhibits a low initial resistance and an increase in the negative electrode resistance with use is effectively suppressed. A non-aqueous electrolyte secondary battery having the constitution can be preferably obtained, for instance, by applying a non-aqueous electrolyte secondary battery production method disclosed herein.

In the non-aqueous electrolyte secondary battery according to a preferable embodiment, the positive electrode comprises a layer comprising difluorophosphate ions. This can prevent dissolution of the transition metal from the positive electrode active material. When the positive electrode comprises as a positive electrode active material a lithium transition metal compound that comprises Mn as a constituent metal, it is especially meaningful that the positive electrode comprises a layer containing difluorophosphate ions. The difluorophosphate ion content in the layer is preferably 0.002 µmol or greater per $cm^2$ of surface area of the positive electrode. This can prevent dissolution of the transition metal to a greater extent. Hereinafter, a layer comprising difluorophosphate ions may be referred to as a "DFP layer". In a preferable embodiment of the art disclosed herein, the DFP layer may be derived from a difluorophosphate salt.

A preferable example of the non-aqueous electrolyte secondary battery disclosed herein is a non-aqueous electrolyte secondary battery using a non-aqueous electrolyte solution comprising the oxalatoborate-based compound and the difluorophosphate salt. In such a non-aqueous electrolyte solution, the difluorophosphate salt concentration $Mc_P$ is preferably 1.5 times to 5 times the oxalatoborate-based compound concentration $Mc_B$.

According to the art disclosed herein, it is possible to obtain a non-aqueous electrolyte secondary battery that exhibits a low initial resistance and gives rise to a less significant increase in the resistance with use. Such a non-aqueous electrolyte secondary battery may provide excellent initial input and output performance at the start of use of the battery and also better maintain the input and output performance over a prolonged period. Accordingly, a non-aqueous electrolyte secondary battery (e.g. a lithium-ion secondary battery) disclosed herein can be preferably used as a power supply for driving a vehicle such as a plug-in hybrid vehicle (PHV), electric vehicle (EV), etc.

Figure 3:
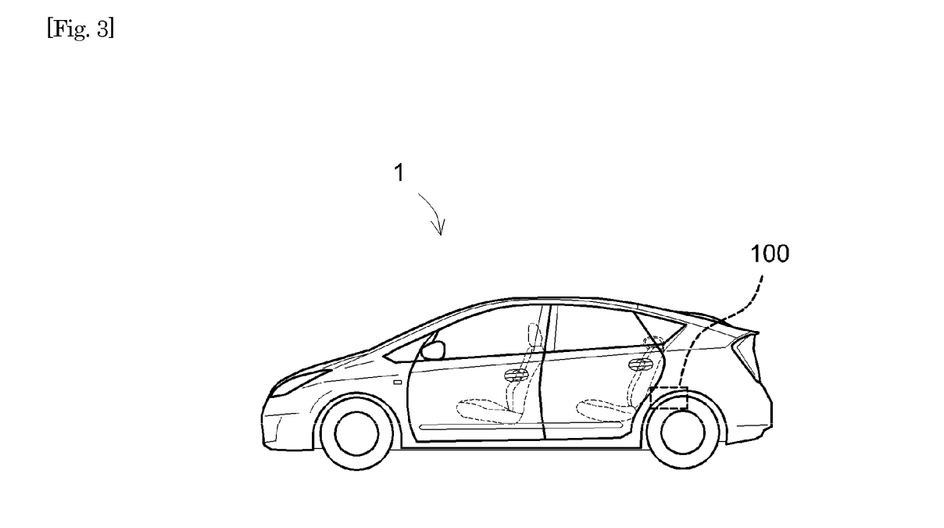
FIG. 3 shows a side view schematically illustrating a vehicle equipped with a non-aqueous electrolyte secondary battery.

As shown in FIG. 3, this description provides, for instance, a vehicle 1 equipped with a non-aqueous electrolyte secondary battery 100 disclosed herein. Non-aqueous electrolyte secondary battery 100 may be produced by a method disclosed herein. Vehicle 1 may be equipped with a battery system in an embodiment where several non-aqueous electrolyte secondary batteries 100 are connected. A preferable example of a vehicle equipped with a non-aqueous electrolyte secondary battery is a vehicle comprising the non-aqueous electrolyte secondary battery as a power source (e.g. PHV, EV and the like that can be charged with the household power supply).

DESCRIPTION OF EMBODIMENTS

While referencing to the drawings, a preferable embodiment of the present invention is described below. In the following drawings, all members and sites providing the same effect are indicated by the same reference numeral, and redundant descriptions may be omitted or simplified. The dimensional relationships (of length, width, thickness, etc.) in each drawing do not necessarily reflect actual dimensional relationships. Matters necessary to practice this invention other than those specifically referred to in this description (e.g. production methods for positive electrode active materials and negative electrode active materials, compositions and production methods of supporting electrolytes, general techniques for constructing batteries, etc.) may be understood as design matters based on the conventional art in the pertinent field to a person of ordinary skills in the art. The present invention can be practiced based on the contents disclosed in this description and common technical knowledge in the subject field.

In this description, the term "secondary battery" refers to a rechargeable, reusable battery in general and includes so-called chemical batteries such as lithium secondary batteries and the like as well as physical batteries such as electric double-layer capacitors and the like.

The term "non-aqueous electrolyte secondary battery" in this description refers to a battery comprising a non-aqueous electrolyte solution. In typical, the non-aqueous electrolyte solution is an electrolyte solution comprising a supporting salt (supporting electrolyte) in a non-aqueous solvent.

The term "lithium-ion secondary battery" in this description refers to a secondary battery that uses lithium ions as electrolytic ions, and is charged and discharged by charge transfer associated with lithium ions between the positive and negative electrodes. A battery generally called lithium-ion secondary battery is a typical example included in the lithium secondary battery in the present description.

The term "active material" in this description refers to a substance capable of reversely storing and releasing (typically intercalating and deintercalating) a chemical species serving as a charge carrier in a secondary battery. The chemical species serving as the charge carrier is primarily the lithium ion in a lithium secondary battery.

Unless otherwise noted, the term "SOC" (state of charge) in this description refers to a state of charge of a battery based on the battery's voltage range for normal use. For instance, it refers to a state of charge based on a rated capacity measured at a voltage across terminals (open circuit voltage (OCV)) of 4.1 V (upper voltage limit) to 3.0 V (lower voltage limit). In this description, a rated capacity can be typically determined under the same conditions as the rated capacity measurement described later in the worked examples.

In this description, the term "1 C" means a current value that allows a fully charged (100% SOC) battery to discharge to its discharge cut-off voltage (0% SOC) in one hour.

Unless otherwise noted, the term "average particle diameter" in this description refers to a median diameter (D50) obtained with a general laser diffraction-type particle size analyzer.

The art disclosed herein can be preferably applied to various non-aqueous electrolyte secondary batteries and their manufacture. Although the present invention is described more in detail below while referring to a lithium-ion secondary battery as an example of the non-aqueous electrolyte secondary battery, applications of the present invention are not limited to lithium-ion secondary batteries.

<<Constitution of Non-Aqueous Electrolyte Secondary Battery>>

Figure 1:
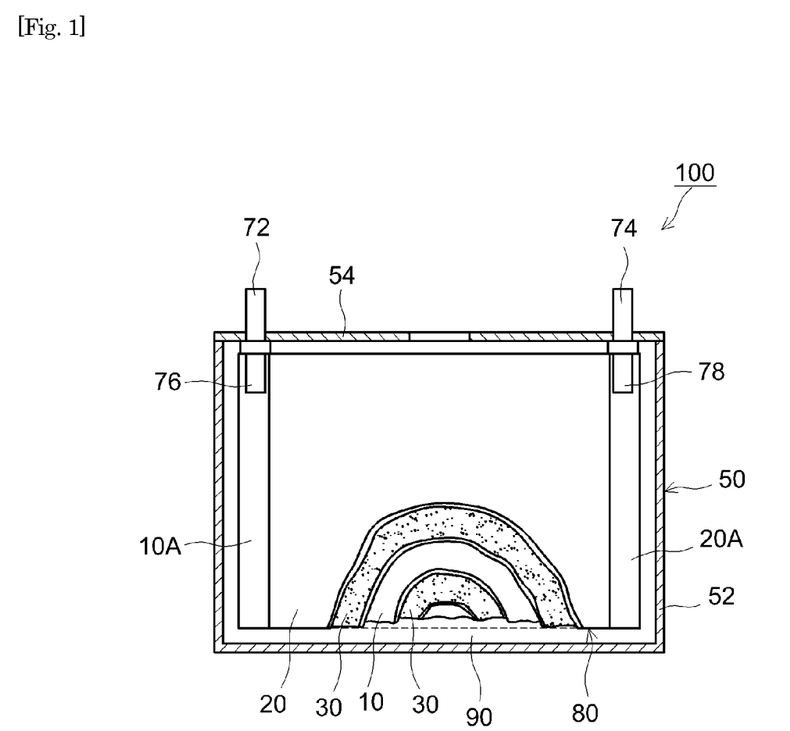
FIG. 1 shows a partial cross-sectional view schematically illustrating the non-aqueous electrolyte secondary battery according to an embodiment.

FIG. 1 shows an outlined constitution of a lithium-ion secondary battery according to an embodiment of the present invention. The lithium-ion secondary battery 100 has a constitution in which an electrode body (wound electrode body) 80 in a form where a long positive electrode sheet 10 and a long negative electrode sheet 20 are wound with two long separator sheets 30 placed in between is contained along with a non-aqueous electrolyte solution 90 in a battery case 50 having a shape (square shape) that can house wound electrode body 80.

Battery case 50 comprises a main casing 52 having a square shape which is open at the top and closed at the bottom, and a lid 54 to close the opening. The upper surface (i.e. lid 54) of battery case 50 is provided with a positive terminal 72 electrically connected to positive electrode sheet (positive electrode) 10 in wound electrode body 80 as well as a negative terminal 74 electrically connected to negative electrode sheet (negative electrode) 20 in wound electrode body 80.

Figure 2:
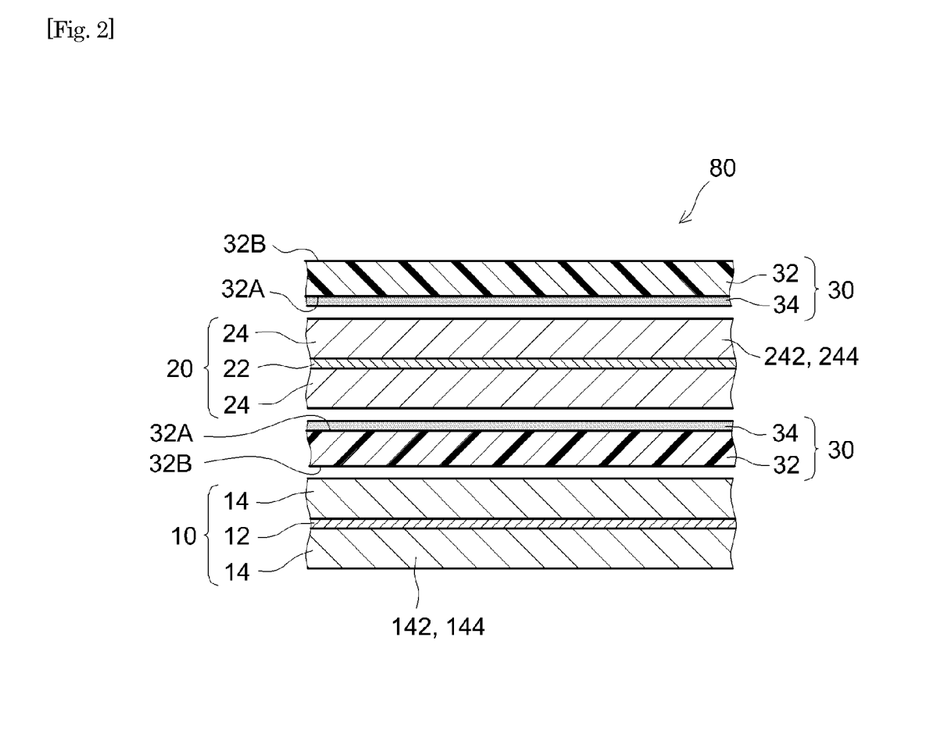
FIG. 2 shows a schematic cross-sectional view illustrating the main part of the non-aqueous electrolyte secondary battery according to an embodiment.

As shown in FIG. 2, positive electrode sheet 10 has a structure such that a long positive current collector sheet 12 retains a positive electrode active material layer 14 comprising a positive electrode active material 142 on each face. As shown in FIG. 1, on a border along a side edge of the width direction of positive electrode sheet 10, a positive electrode active material layer-free portion 10A is provided, having no positive electrode active material layer 14 to expose positive current collector 12. Similarly to positive electrode sheet 10, negative electrode sheet 20 also has a structure where a long negative current collector 22 retains a negative electrode active material layer 24 comprising a negative electrode active material 242 on each face. On a border along a side edge of the width direction of negative electrode sheet 20, a negative electrode active material layer-free portion 20A is provided, having no negative electrode active material layer 24 to expose negative current collector 22.

When fabricating wound electrode body 80, positive electrode sheet 10 and negative electrode sheet 20 are stacked via a separator sheet 30. Herein, as shown in FIG. 1, positive electrode sheet 10 and negative electrode sheet 20 are overlaid, yet slightly displaced in the width direction so that positive electrode active material layer-free portion 10A in positive electrode sheet 10 and negative electrode active material layer-free portion 20A in negative electrode sheet 20 run off the two sides of the width direction of separator sheets 30, respectively. By winding the sheets 10, 20 and 30 thus layered in the length direction, wound electrode body 80 can be fabricated.

At a central portion in the winding axial direction of wound electrode body 80, a wound core part is formed (i.e. a region where positive electrode active material layer 14 in positive electrode sheet 10, negative electrode active material layer 24 in negative electrode sheet 20 and separator sheets 30 are tightly stacked). At the two edges of the winding axial direction of wound electrode body 80, electrode active material layer-free portions 10A and 20A in positive electrode sheet 10 and negative electrode sheet 20 stick out of the wound core part, respectively. At such positive electrode-side sticking-out portion and negative electrode-side sticking-out portion, ends of positive current collector plate 76 and negative current collector plate 78 are attached, respectively. The other ends of these current collector plates 76 and 78 are electrically connected to positive terminal 72 and negative terminal 74 described above, respectively.

As shown in FIG. 2, as separator 30, one constituted as a heat-resistant separator comprising an organic porous layer 32 and an inorganic porous layer 34 retained on the first face 32A thereof can be preferably used. In the present embodiment, two sheets of heat-resistant separator 30 are placed so that the inorganic porous layers 34 face the negative electrode active material layers 24. In FIG. 2, the respective sheets 10, 20 and 30 are shown with spaces in between for clearer illustration. In an actual electrode body 80, however, it is preferable that these sheets are layered essentially without any spaces.

On the surface of negative electrode active material 242 contained in the negative electrode active material layer 24 shown in FIG. 2, there is formed a layer (OB layer) 244 derived from an oxalatoborate-based compound. On the surface of positive electrode active material 142 contained in the positive electrode active material layer 14, there is preferably formed a layer (DFP layer) 144 comprising difluorophosphate ions. Methods for forming these OB layer 244 and DFP layer 144 are described later.

As non-aqueous electrolyte solution 90, a solution comprising a non-aqueous solvent and an oxalatoborate-based compound is used. In an embodiment where the positive electrode sheet 10 comprises a DFP layer 144, it is preferable to use a non-aqueous electrolyte solution 90 further comprising a difluorophosphate salt. In lithium-ion secondary battery 100, after constituted with a non-aqueous electrolyte solution 90 having such a composition, part or all of the oxalatoborate-based compound and difluorophosphate salt in the non-aqueous electrolyte solution 90 may have decomposed.

Lithium-ion secondary battery 100 having such a constitution can be preferably manufactured by placing wound electrode body 80 and non-aqueous electrolyte solution 90 in battery case 50 to construct the battery cell, followed by charging the battery cell to form an OB layer on the negative electrode and modifying the OB layer. Formation and modification of the OB layer are described next in detail.

<<Production of Non-Aqueous Electrolyte Secondary Battery>>

In the production method disclosed herein, after a battery cell having a non-aqueous electrolyte solution comprising an oxalatoborate-based compound is constructed, the battery cell is charged. In a preferable embodiment, the charging is carried out as part of conditioning (initial charging and discharging) of the battery. The conditioning may comprise a process where the battery is subjected to one to three cycles of charging and discharging. The charging is typically carried out to about 100% SOC. The charging rate can be, for instance, about 1/20 C to 5 C. The discharging is typically carried out to about 0% SOC. The discharging rate can be, for instance, about 1/20 C to 5 C.

During the conditioning (in typical, primarily during the first charging), the oxalatoborate-based compound contained in the non-aqueous electrolyte solution is electrically decomposed primarily on or near the surface of the negative electrode. The decomposition product(s) stick (are deposited, adsorbed, etc.) to the negative electrode active material to form a layer (i.e. OB layer) derived from the oxalatoborate-based compound on the surface of the negative electrode active material. The OB layer may comprise, in addition to the component(s) derived from the oxalatoborate-based compound (decomposition product(s) of the oxalatoborate-based compound), other components (e.g. non-aqueous solvent) forming the electrolyte solution or their decomposition products, etc. Reductive decomposition occurs at about 1.73 V with respect to lithium bis(oxalate)borate which is a preferable example of the oxalatoborate-based compound in the art disclosed herein.

The production method disclosed herein is characterized by comprising a treatment to intentionally modify the OB layer produced by the conditioning. The modification can reduce the resistance in the OB layer or even the resistance in the negative electrode comprising the OB layer. The level of negative electrode resistance can be assessed, for instance, through a Li precipitation test described later.

The OB layer modification may be, for instance, an aging treatment in which the battery cell charged to a certain level is stored in a temperature range above room temperature. For example, the battery cell adjusted to 50% SOC can be subjected to a modification treatment. In typical, by increasing the battery cell's SOC, the OB layer can be modified more efficiently. In other words, the modification time required to obtain desirable modification effects can be reduced to increase the productivity of the non-aqueous electrolyte secondary battery. From such a standpoint, the battery cell up for modification has an SOC of preferably 60% or higher (e.g. 65% or higher), more preferably 70% or higher, or even more preferably 80% or higher (typically 82% or higher, e.g. about 90% or higher). On the other hand, from the standpoint of suppressing battery degradation during the modification treatment, it is usually suitable that the battery cell up for modification is at or below 100% SOC.

When an unexpected metal impurity is present in the battery cell, storing the battery cell charged to a certain level in a temperature range above room temperature helps dissolution of the metal impurity, allowing more accurate detection of defects (minute short circuits, etc.) in the battery before its shipment. From the standpoint of improving such pre-shipment battery defect detection, it is preferable to carry out the aging treatment under conditions satisfying at least either (preferably both) an SOC not lower than 70% or (and) a voltage not lower than 3.8 V. This is because such conditions may effectively accelerate dissolution of the metal impurity.

In a battery cell having a constitution according to a worked example described later, the voltage across terminals is about 3.7 V at 60% SOC while it is 4.1 V at 100% SOC.

The modification treatment may be carried out by storing the battery cell at a temperature of 50° C. or above. To modify the OB layer more efficiently, it is more advantageous to store the battery cell at a higher temperature. From such a standpoint, the temperature at which the battery cell is stored is preferably 60° C. or higher, or more preferably 70° C. or higher. On the other hand, from the standpoint of suppressing battery cell degradation (e.g. degradation of the positive electrode active material, decomposition of the non-aqueous solvent, etc.) during the modification treatment, the temperature is usually suitably 90° C. or lower, or preferably 85° C. or lower.

The time for carrying out the modification treatment (i.e. the time for storing a battery cell adjusted to the SOC at the aforementioned temperature) is not particularly limited. It can be suitably selected so as to obtain desirable modification effects. In view of the cost required for the modification treatment or the productivity of the battery, etc., the time for carrying out the modification treatment is usually suitably 240 hours or less (i.e. 10 days or less), preferably 168 hours or less (i.e. 7 days or less), more preferably 48 hours or less, or even more preferably 36 hours or less (e.g. 30 hours or less). It is preferable to set the battery cell's SOC and storage temperature so as to obtain desirable modification effects within these periods of time. In order to obtain sufficient modification effects, the time for carrying out the modification treatment is usually suitably 5 hours or more, or preferably 10 hours or more (e.g. 15 hours or more).

The aforementioned preferable SOC values of the battery cell up for modification refer to SOC values at the start of modification, and some decrease in the SOC during the modification time is acceptable. From the standpoint of the treatment efficiency, it is preferable to maintain the SOC at 50% or higher (more preferably 60% or higher, even more preferably 70% or higher) until the completion of modification treatment.

The OB layer typically comprises boron (B) and oxalate ions derived from an oxalatoborate-based compound (e.g. lithium bis(oxalate)borate (LiBOB)). Boron in the OB layer stabilizes the OB layer on the negative electrode active material surface and is a component effective for inhibiting an excessive growth of SEI layer on the OB layer. On the other hand, oxalate ions contained in the OB layer may be a cause to increase the OB layer's resistance. Accordingly, by decreasing the amount of oxalate ions in the OB layer, the OB layer's resistance can be decreased while maintaining the OB layer's effect of inhibiting the growth of SEI layer.

That is, in the art disclosed herein, modification of the OB layer may be a treatment to reduce the number of moles $m_A$ of oxalate ions relative to the number of moles $m_B$ of boron contained in the OB layer. In other words, it may be a treatment to increase the ratio ($m_B/m_A$ ratio) of number of moles $m_B$ of boron to number of moles $m_A$ of oxalate ions. For instance, by removing (withdrawing) oxalate ions from the OB layer, the $m_B/m_A$ ratio can be increased. The aging treatment is a suitable example of a method for increasing the OB layer's $m_B/m_A$ ratio. In other words, the modification treatment in the art disclosed herein can be a treatment to increase the $m_B/m_A$ ratio by a method other than the aging treatment or a treatment to increase the $m_B/m_A$ ratio by combining the aging treatment and other method(s).

The extent of increasing the $m_B/m_A$ ratio by the modification treatment is not particularly limited. The $m_B/m_A$ ratio after modification just needs to be greater than the $m_B/m_A$ ratio before modification. In other words, the modification treatment can be carried out so that the $m_B/m_A$ ratio after modification is greater than 1.0 times the $m_B/m_A$ ratio before modification. In a preferable embodiment, the modification treatment can be carried out so that the $m_B/m_A$ ratio after modification is, for instance, 1.2 times or greater the $m_B/m_A$ ratio before modification. It is carried out more preferably so as to yield a 1.5-fold or greater increase, or even more preferably to yield a 2.0-fold or greater increase.

The OB layer's $m_B/m_A$ ratio before modification may have a value roughly reflecting the chemical structure of the oxalatoborate-based compound used. For example, when using a non-aqueous electrolyte solution comprising solely LiBOB as the oxalatoborate-based compound, the unmodified OB layer's $m_B/m_A$ ratio may be about 2.0 (usually 2.0±0.3, typically 2.0±0.2).

In the non-aqueous electrolyte secondary battery production method disclosed herein, the OB layer's modification treatment can be carried out so that the $m_B/m_A$ ratio is, for instance, 2.5 or higher. To obtain greater resistance-reducing effects, the modification treatment is carried out so that the $m_B/m_A$ ratio is preferably 3.0 or higher, more preferably 3.5 or higher, or even more preferably 4.0 or higher (e.g. 5.0 or higher). The upper limit of $m_B/m_A$ ratio is not particularly limited. In view of influences on the battery cell productivity and other battery performance, it is usually suitable to carry out the OB layer's modification treatment so that the $m_B/m_A$ ratio is about 25 or lower (typically 20 or lower, e.g. 15 or lower).

This description provides a non-aqueous electrolyte secondary battery including a negative electrode that comprises an OB layer comprising boron and oxalate ions wherein the OB layer has an $m_B/m_A$ ratio of 2.5 or higher (preferably 3.0 or higher, more preferably 3.5 or higher, or yet more preferably 4.0 or higher, e.g. 5.0 or higher). In the non-aqueous electrolyte secondary battery, the OB layer's $m_B/m_A$ ratio is preferably 25 or lower (typically 20 or lower, e.g. 15 or lower).

The oxalate ion content in the modified OB layer is preferably 0.10 μmol or less per cm² of surface area of negative electrode (i.e. 0.10 μmol/cm² or less), more preferably 0.09 μmol/cm² or less, or yet more preferably 0.08 μmol/cm² or less (e.g. 0.07 μmol/cm² or less). A non-aqueous electrolyte secondary battery that comprises a negative electrode comprising an OB layer having such an oxalate ion concentration (content per surface area) is preferable. In a preferable embodiment, the oxalate ion concentration in the modified OB layer may be 0.06 μmol/cm² or lower. Herein, the term "surface area of negative electrode" refers to a surface area of a region of the negative electrode on which the negative electrode active material is placed. Thus, in a negative electrode constituted to comprise a current collector sheet and a negative electrode active material layer provided on the current collector, it can be understood as the surface area of negative electrode active material layer.

The lower limit of oxalate ion concentration in the modified OB layer is not particularly limited. From the standpoint of the treatment efficiency, etc., it is usually suitably 0.001 μmol/cm² or greater (e.g. 0.01 μmol/cm² or greater). The OB layer may be essentially free of oxalate ions. Herein, being "essentially free of oxalate ions" means that the oxalate ion content is at or below the detection limit in IC (ion chromatography) analysis.

The oxalate ion concentration in the unmodified OB layer is not particularly limited. It is usually suitably about 0.05 μmol/cm² to 3.0 μmol/cm², or preferably about 0.07 μmol/cm² to 2.0 μmol/cm².

From the standpoint of effectively inhibiting growth of SEI layer on the OB layer, the boron content in the modified OB layer is preferably 0.15 μmol or greater per cm² of surface area of negative electrode (i.e. 0.15 μmol/cm² or greater), or more preferably 0.20 μmol/cm² or greater (e.g. 0.25 μmol/cm² or greater). A non-aqueous electrolyte secondary battery that comprises a negative electrode comprising an OB layer having such a boron concentration is preferable. To obtain such a boron concentration in the modified OB layer, the boron content in the unmodified OB layer is suitably 0.15 μmol/cm$^2$ or greater, or preferably 0.20 μmol/cm$^2$ or greater (e.g. 0.25 μmol/cm$^2$ or greater).

The boron content in the modified OB layer is preferably 2.0 μmol/cm$^2$ or less, or more preferably 1.0 μmol/cm$^2$ or less. By this, a non-aqueous electrolyte secondary battery comprising a negative electrode having a lower initial resistance can be obtained. For the same reason, the boron content in the unmodified OB layer is also preferably 2.0 μmol/cm$^2$ or less, or more preferably 1.0 μmol/cm$^2$ or less.

That boron is at a level at or below the detection limit in ICP (high frequency inductive coupling plasma) emission analysis is sometimes described as "being essentially free of boron".

As described above, by eliminating oxalate ions from the OB layer, the OB layer's resistance can be reduced. To eliminate oxalate ions from the OB layer, it is effective to store the battery cell charged to a certain level in a temperature range above room temperature. To obtain desirable modification effects in a shorter time period, it is preferable to carry out an aging treatment such that the battery cell adjusted to a relatively high SOC (typically 80% or higher, preferably 82% or higher, e.g. 85% or higher) or to a relatively high battery voltage (typically 3.8 V or higher, e.g. 3.9 V or higher) is stored at a temperature of 60° C. or above (e.g. 60° C. to 80° C.).

Herein, when the temperature for the aging treatment is set at 60° C. or above, during the aging treatment, the transition metal(s) contained in the positive electrode active material may partially dissolved out. Such transition metal dissolution is likely to occur when the positive electrode active material comprises a lithium transition metal oxide, in particular, when it comprises a layered lithium transition metal oxide containing at least Mn as a constituent metal (e.g. a LiNiCoMn oxide described later). When the transition metal is dissolved out from the positive electrode active material, the composition of the positive electrode active material may change and the battery durability may tend to decrease. Precipitation of the dissolved transition metal outside the positive electrode active material (e.g. on the negative electrode) will consume the effective capacity (capacity capable of contributing to charging and discharging) of the negative electrode active material, possibly becoming a cause to decrease the capacity retention of the battery.

In a preferable embodiment of the art disclosed herein, to prevent dissolution of transition metal(s) from the positive electrode active material, the battery cell is constructed with a non-aqueous electrolyte solution comprising a difluorophosphate salt in addition to an oxalatoborate-based compound. The difluorophosphate salt may decompose upon charging of the battery cell (primarily during initial charging) with its decomposition products sticking (being deposited, adsorbed, etc.) to the positive electrode active material to form a layer (DFP layer) comprising difluorophosphate ions on the surface of the positive electrode active material. The DFP layer may prevent dissolution of transition metal(s) (e.g. Mn) from the positive electrode active material.

To produce a greater effect of preventing the transition metal dissolution, it is preferable to form a DFP layer so that the amount of difluorophosphate ions is 0.0015 μmol or greater per cm$^2$ of surface area of positive electrode. Herein, the term "surface area of positive electrode" refers to a surface area of a region of the positive electrode on which the positive electrode active material is placed. Thus, in a positive electrode constituted to comprise a current collector sheet and a positive electrode active material layer provided on the current collector, it can be understood as the surface area of positive electrode active material layer. With the amount of difluorophosphate ions being 0.002 μmol/cm$^2$ or greater (e.g. 0.0025 μmol/cm$^2$ or greater), a greater effect of preventing transition metal dissolution can be obtained. The amount of difluorophosphate ions may be 0.005 μmol/cm$^2$ or greater. In view of the balance with other battery properties, it is usually suitable to form a DFP layer so that the amount of difluorophosphate ions is 0.05 μmol/cm$^2$ or less (preferably 0.01 μmol/cm$^2$ or less).

In a lithium-ion secondary battery comprising a wound electrode body as described above, the transition metal (e.g. Mn) dissolution is particularly likely to occur during the OB layer modification treatment, when the negative electrode sheet comprises a negative current collector and negative electrode active material layers formed on the outer side (i.e. on the face on the outer circumference of the wound body) and inner side thereof while on the outermost circumference of the wound electrode body, the negative electrode active material layer formed on the outer side forms a non-positive-electrode-active-material-layer-facing portion that does not face a positive electrode active material layer. Presumably, this is because at the start of modification treatment, of the negative electrode active material layers, the non-positive-electrode-active-material-layer-facing portion tends not to be packed with sufficient lithium ions; however, during the modification treatment, lithium ions diffuse from the negative electrode active material layer on the back of the non-positive-electrode-active-material-layer-facing portion (i.e. the negative electrode active material layer formed on the inner side of the negative current collector) to the non-positive-electrode-active-material-layer-facing portion, thereby making the potential of the positive electrode sheet higher at the portion facing the negative electrode active material layer on the back than at the other portions. This phenomenon is particularly likely to occur at the edge of the positive electrode sheet on the side where positive electrode active material layers are formed (typically, at the edge opposite of the positive electrode active material layer-free portion). This is because lithium ion diffusion is the greatest from the negative electrode active material layer facing the positive electrode active material layer at this location (i.e. the negative electrode active material layer on the back of the non-positive-electrode-active-material-layer-facing portion) to the non-positive-electrode-active-material-layer-facing portion. Thus, in a lithium-ion secondary battery and other non-aqueous electrolyte secondary batteries having such a constitution, it is particularly meaningful to prevent dissolution of transition metal(s) from the positive electrode active material.

Presumably, the phenomenon described above is not limited to wound electrode bodies and may also occur similarly in layered electrode bodies.

The non-aqueous secondary battery production method disclosed herein may comprise, as necessary, steps for degassing, quality inspection, etc., at arbitrary timings. For instance, degassing can be carried out at least after either the conditioning or the OB layer modification treatment.

<<Non-Aqueous Electrolyte Solution>>

In the art disclosed herein, as the non-aqueous electrolyte used for constructing the battery cell, is used a solution comprising a non-aqueous solvent and an oxalatoborate-based compound. What is typically used is a non-aqueous electrolyte solution that further comprises a lithium compound (supporting electrolyte) soluble in the non-aqueous solvent to supply lithium ions in addition to the non-aqueous solvent and oxalatoborate-based compound.

<<Non-Aqueous Solvent>>

As the non-aqueous solvent, can be used solvents similar to those used in electrolyte solutions for use in heretofore general lithium-ion secondary batteries. Such a non-aqueous electrolyte solution typically comprises a non-aqueous solvent and a lithium compound (supporting electrolyte) soluble in the solvent to supply lithium ions. As the non-aqueous solvent, can be used aprotic solvents such as carbonates, esters, ethers, nitriles, sulfones, lactones, etc. For example, can be used one, two or more species selected from non-aqueous solvents generally known to be usable for electrolyte solutions in lithium-ion secondary batteries, such as ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, etc.

Preferable examples of non-aqueous solvents for the electrolyte solution in the art disclosed herein include a non-aqueous solvent primarily comprising a carbonate. In a non-aqueous electrolyte secondary battery comprising a non-aqueous electrolyte of such a composition, application of the art disclosed herein carries especially significant meaning. For example, can be preferably used a non-aqueous electrolyte solution comprising one, two or more species of carbonates as the non-aqueous solvent, with the combined volume of these carbonates accounting for 60% by volume or higher (more preferably 75% by volume or higher, even more preferably 90% by volume or higher, or even essentially 100% by volume) of the total volume of the non-aqueous solvent.

<<Oxalatoborate-Based Compound>>

A typical example of the oxalatoborate-based compound in the art disclosed herein is an oxalato complex having a structural moiety with at least one oxalate ion $(C_2O_4^{2-})$ in coordination with boron (B). Examples of preferable oxalatoborate-based compounds include compounds represented by the following formulas (I) and (II).

[Chem 1]

(I)

[Chem 2]

(II)

Herein, $R_1$ and $R_2$ in the formula (I) are independently selected from halogen atoms (e.g. F, Cl, Br; preferably F) and perfluoroalkyl groups having 1 to 10 (preferably 1 to 3) carbon atoms, respectively. In the formulas (I) and (II), $A^+$ can be either an inorganic cation or an organic cation. Specific examples of inorganic cations include cations of alkali metals such as Li, Na, K, etc.; cations of alkaline earth metals such as Be, Mg, Ca, etc.; cations of other metals such as Ag, Zn, Cu, Co, Fe, Ni, Mn, Ti, Pb, Cr, V, Ru, Y, a lantanoid, an actinoid, etc.; proton; and the like. Specific examples of organic cations include tetraalkylammonium ions such as tetrabutylammonium ion, tetraethylammonium ion, tetramethylammonium ion, triethylmethylammonium ion, etc.; and trialkylammonium ions such as trimethylammonium ion, triethylammonium ion, etc.; as well as pyridinium ion, imidazolium ion, tetraethylphosphonium ion, tetramethylphosphonium ion, tetraphenylphosphonium ion, triphenylsulfonium ion, triethylsulfonium ion; and the like. Examples of preferable cations include Li ion, tetraalkylammonium ion and proton.

Such an oxalatoborate-based compound can be prepared by a known method or obtained by purchasing a commercial product, etc. Usually, as the oxalatoborate-based compound, a compound represented by the formula (II) can be preferably used. A particularly preferable oxalatoborate-based compound is lithium bis(oxalato)borate ($LiB(C_2O_4)_2$, or "LiBOB" hereinafter) represented by formula (III).

[Chem 3]

(III)

In the art disclosed herein, the oxalatoborate-based compound concentration $Mc_B$ in the non-aqueous electrolyte solution used for constructing the battery cell is not particularly limited and can be suitably set so as to form on the negative electrode an OB layer capable of producing desirable SEI layer growth-inhibiting effects. From the standpoint of facile preparation of the non-aqueous electrolyte solution, etc., in usual, a non-aqueous electrolyte solution having an oxalatoborate-based compound concentration $Mc_B$ of about 0.005 mol/kg to 0.50 mol/kg (more preferably about 0.01 mol/kg to 0.20 mol/kg) can be preferably used. For example, the use of a non-aqueous electrolyte solution at $Mc_B$ of 0.015 mol/kg to 0.10 mol/kg (more preferably 0.015 mol/kg to 0.05 mol/kg) is preferable. When the $Mc_B$ is too low, poorer effects of inhibiting SEI layer growth may result. When the $Mc_B$ is too high, the time required for OB layer modification may increase, leading to a decreasing tendency of the productivity.

<<Difluorophosphate Salt>>

The difluorophosphate salt used in the art disclosed herein can be various kinds of salt having a difluorophosphate anion ($PO_2F_2^-$). The cation (counter cation) in such a difluorophosphate salt may be either an inorganic cation or an organic cation. Specific examples of inorganic cations include cations of alkali metals such as Li, Na, K, etc.; cations of alkaline earth metals such as Be, Mg, Ca, etc.; and the like. Specific examples of organic cations include ammonium cations such as tetraalkylammonium ion, trialkylammonium ion, etc. Such a difluorophosphate salt can be prepared by a known method or obtained by purchasing a commercial product, etc. Usually, it is preferable to use a salt of a difluorophosphate anion and an inorganic cation (e.g. an alkali metal cation) as the difluorophosphate salt. A preferable example of the difluorophosphate salt in the art disclosed herein is lithium difluorophosphate ($LiPO_2F_2$).

In the art disclosed herein, the difluorophosphate salt concentration $Mc_P$ in the non-aqueous electrolyte solution used for constructing the battery cell is not particularly limited and can be suitably set so as to form on the positive electrode a DFP layer capable of producing desirable transition metal dissolution-preventing effects. From the standpoint of facile preparation of the non-aqueous electrolyte solution, etc., in usual, a non-aqueous electrolyte solution having an $Mc_P$ of about 0.02 mol/kg to 1.0 mol/kg (more preferably about 0.02 mol/kg to 0.50 mol/kg, even more preferably about 0.03 mol/kg to 0.20 mol/kg, e.g. 0.05 mol/kg to 0.15 mol/kg) can be preferably used.

In the art disclosed herein, in the non-aqueous electrolyte solution used for constructing the battery cell, the number of moles of the difluorophosphate salt contained in 1 kg of the non-aqueous electrolyte solution is preferably 1.5 times to 10 times the number of moles of the oxalatoborate-based compound. That is, a non-aqueous electrolyte solution with the difluorophosphate salt concentration $Mc_P$ being 1.5 times to 10 times the oxalatoborate-based compound concentration $Mc_B$ can be preferably used. A non-aqueous electrolyte solution having such a composition can combine effects by the use of the oxalatoborate-based compound and effects by the use of the difluorophosphate salt (i.e. effect of preventing transition metal dissolution that may occur upon OB layer modification) in a well-balanced manner. It is more preferable to use a non-aqueous electrolyte solution with the difluorophosphate concentration $Mc_P$ being 1.5 times to 5 times the oxalatoborate-based compound concentration $Mc_B$.

<<Supporting Electrolyte>>

As the supporting electrolyte, can be suitably used various materials known to serve as supporting salts in lithium-ion secondary batteries. For example, can be used one, two or more species selected from various lithium salts known to be able to serve as supporting electrolytes in lithium-ion secondary batteries, such as $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$, $LiClO_4$ and the like (while excluding lithium salts considered as oxalatoborate-type compounds and difluorophosphates). In particular, $LiPF_6$ can be preferably used.

The concentration of the supporting electrolyte (supporting salt) is not particularly limited, and can be, for instance, about the same as in a conventional lithium-ion secondary battery. Usually, a non-aqueous electrolyte solution containing a supporting electrolyte at a concentration of 0.1 mol/L to 5 mol/L (preferably 0.8 mol/L to 1.5 mol/L, e.g. 1.0 mol/L to 1.2 mol/L) can be preferably used.

The non-aqueous electrolyte solution can comprise, as necessary, other component(s) besides the aforementioned oxalatoborate-based compound, difluorophosphate salt, supporting electrolyte and non-aqueous solvent to a degree that does not significantly impair the effects by the present invention. Examples of such optional components include additives such as a monofluorophosphate salt (typically a lithium salt), a phosphorous(P)-containing oxalato compound, vinylene carbonate (VC), vinyl ethylene carbonate (VEC), fluoroethylene carbonate (FEC) and the like. The concentration of the additive as such an optional component (when several species are contained, their combined concentration) is usually suitably 0.20 mol/kg or less. For instance, it can be 0.10 mol/kg or less (typically 0.01 mol/kg to 0.10 mol/kg). Alternatively, it may be a non-aqueous electrolyte solution essentially free of other components besides the oxalatoborate-based compound, difluorophosphate salt, supporting electrolyte and non-aqueous solvent.

The use of a non-aqueous electrolyte solution comprising an oxalatoborate-based compound (e.g. LiBOB) in a non-aqueous electrolyte secondary battery can be assessed, for instance, by collecting a measurement sample from the components (positive electrode active material layer surface, negative electrode active material layer surface, etc.) of the battery and detecting boron (B) by ICP emission analysis, ion chromatography, etc. The measurement sample is preferably subjected to analysis after a suitable treatment such as washing with a suitable solvent (e.g. EMC), etc.

The oxalatoborate-based compound content in the non-aqueous electrolyte solution used for constructing the battery cell (in other words, the amount of the oxalatoborate-based compound supplied into the battery case) can be determined, for instance, by methods for quantitating the boron contents in the positive electrode and negative electrode by ICP emission analysis, for subjecting the non-aqueous electrolyte solution remaining in the battery case to ICP emission analysis to quantitate the boron content in the electrolyte solution, for subjecting the positive electrode and negative electrode or the electrolyte solution to ion chromatography to quantitate the oxalatoborate-based compound and chemical species resulting from decomposition products thereof, and like method. From the oxalatoborate-based compound content and the electrolyte solution content in the battery case, the oxalatoborate-based compound concentration (mol/kg) in the non-aqueous electrolyte solution used for constructing the battery cell can be determined.

The boron content in the unmodified or modified OB layer can be quantitated, for instance, by ICP emission analysis.

The oxalate ion content in the unmodified or modified OB layer can be quantitated, for instance, by ion chromatography.

The use of a non-aqueous electrolyte solution comprising a difluorophosphate salt in a non-aqueous electrolyte secondary battery can be assessed, for instance, by collecting a measurement sample from a component (positive and negative electrode active material layer surfaces, etc.) of the battery and detecting phosphorous (P) by ICP emission analysis, ion chromatography, mass spectrometry (MS), etc. According to such analysis, even when the battery uses a non-aqueous electrolyte solution comprising, for instance, $LiPF_6$ as a supporting electrolyte (supporting salt), the presence of phosphorous derived from the difluorophosphate salt (e.g. $LiPO_2F_2$) can be confirmed, separately from the $LiPF_6$-derived phosphorous.

The difluorophosphate salt content in the non-aqueous electrolyte solution used for constructing the battery cell (in other words, the amount of the difluorophosphate salt supplied into the battery case) can be determined, for instance, by methods for quantitating the amounts of $PO_2F_2$ ions, $PO_3F$ ions and $PO_4$ ions on the positive and negative electrode active material layer surfaces by ion chromatography, for subjecting the non-aqueous electrolyte solution remaining in the battery case to ion chromatography analysis to quantitate the difluorophosphate salt and chemical species resulting from decomposition products thereof, and like method. From the difluorophosphate salt content and the electrolyte solution content in the battery case, the difluorophosphate salt concentration (mol/kg) in the non-aqueous electrolyte solution used for constructing the battery cell can be determined.

The difluorophosphate ion content in the DFP layer can be quantitated, for instance, by ion chromatography.

The amount of Mn precipitation on the negative electrode can be quantitated, for instance, by ICP emission analysis. According to the amount of Mn precipitation on the negative electrode, the level of the amount of Mn dissolved from the positive electrode active material can be assessed. In other words, while dissolution of Mn from the positive electrode active material occur primarily in a high SOC state, the negative electrode potential then is low (e.g. negative electrode potential 0.1 V/vs. Li); and therefore, it is presumed that the dissolved Mn tends to precipitate out on the negative electrode. Thus, by quantitating the Mn content in the negative electrode, the level (whether large or small) about the amount of Mn dissolved out from the positive electrode active material can be assessed.

<<Negative Electrode Sheet>>

The negative electrode active material layer constituting the negative electrode sheet can be preferably prepared, for instance, by applying to a negative current collector a paste-like or slurry composition of a negative electrode active material and a binder used as necessary dispersed in a suitable solvent, followed by allowing the composition to dry. After dried, it can be pressed entirely as necessary. The mass of negative electrode active material layer provided per unit surface area of negative current collector (in a constitution having a negative electrode active material layer on each face of the negative current collector, the combined mass for the two faces) is suitably, for instance, about 6 mg/cm$^2$ to 30 mg/cm$^2$. The negative electrode active material layer may have a density of, for example, about 0.9 g/cm$^3$ to 1.5 g/cm$^3$.

As the negative current collector, a member formed of a highly conductive metal is preferably used. For instance, copper or an alloy containing copper as the primary component can be used. For instance, an about 5 μm to 30 μm thick copper sheet (copper foil) can be preferably used as the negative current collector.

Examples of binder include carboxymethyl cellulose (CMC, a sodium salt is typically used), polyvinyl alcohol (PVA), polytetrafluoroethylene (PTFE), styrene-butadiene rubber (SBR), polyvinylidene fluoride (PVDF) and the like. These binders can be used as one species solely or in combination of two or more species.

The negative electrode active material content in the entire negative electrode active material layer is not particularly limited. It is usually suitably about 50% by mass or greater, or preferably about 90 to 99% by mass (e.g. about 95 to 99% by mass). When a binder is used, it can be added in an amount suitably selected in accordance with the type or amount of negative electrode active material. For instance, it can be about 1 to 5% by mass of the entire negative electrode active material layer.

<<Negative Electrode Active Material>>

As the negative electrode active material, one, two or more species among various materials known to be usable in lithium-ion secondary batteries can be used without particular limitations. Preferable examples of negative electrode active material include carbon materials A particulate carbon material (carbon particles) having a graphite structure (layered structure) at least partially is preferable. Any carbon material can be preferably used among so-called graphitic substances (graphites), hard-to-graphitize carbonaceous substances (hard carbons), easy-to-graphitize carbonaceous substances (soft carbons) and substances having a structure combining these. Among these, graphite particles such as natural graphite, etc., can be preferably used. It may be carbon particles obtained by applying non-crystalline (amorphous) carbon to graphite surfaces, etc.

The negative electrode active material preferably has an average particle diameter in a range of, for instance, 5 μm to 40 μm (more preferably 5 μm to 30 μm, e.g. 5 μm to 20 μm).

The negative electrode active material preferably has a BET specific surface area in a range of, for instance, 1.0 m$^2$/g to 10.0 m$^2$/g (more preferably 3.0 m$^2$/g to 6.0 m$^2$/g.

<<Positive Electrode Sheet>>

The positive electrode active material layer constituting the positive electrode sheet can be preferably prepared, for instance, by applying to a positive current collector a paste-like or slurry composition of a positive electrode active material as well as a conductive material and a binder used as necessary which are dispersed in a suitable solvent, followed by allowing the composition to dry. After dried, it can be pressed entirely as necessary. The mass of positive electrode active material layer provided per unit surface area of positive current collector (in a constitution having a positive electrode active material layer on each face of the positive current collector, the combined mass for the two faces) is suitably, for instance, about 8 mg/cm$^2$ to 30 mg/cm$^2$. The positive electrode active material layer may have a density of, for example, about 1.8 g/cm$^3$ to 2.9 g/cm$^3$.

As the positive current collector, a member formed of a highly conductive metal is preferably used. For example, aluminum or an alloy containing aluminum as the primary component can be used. For instance, an about 10 μm to 30 μm thick aluminum sheet (aluminum foil) can be preferably used as the positive current collector.

As the conductive material, a conductive powdery material such as carbon powder and carbon fiber are preferably used. Preferable examples of carbon powder include various kinds of carbon black, such as acetylene black, furnace black, Ketjen black, graphite powder and the like. Conductive materials can be used as one species solely or in combination of two or more species. As the binder, the same species as those for the positive electrode described earlier can be used singly or in combination of two or more species.

The positive electrode active material content in the entire positive electrode active material layer is suitably about 50% by mass or greater (typically 50 to 95% by mass), or usually preferably about 70 to 95% by mass. When a conductive material is used, the conductive material content in the entire positive electrode active material layer can be, for instance, about 2 to 20% by mass, or usually preferably about 2 to 15% by mass. When a binder is used, the binder content in the entire positive electrode active material layer can be about 1 to 10% by mass or usually suitably about 2 to 5% by mass.

<<Positive Electrode Active Material>>

As the positive electrode active material, a material capable of reversely storing and releasing lithium is used. One, two or more species among various materials known to be usable as positive electrode active materials in lithium-ion secondary batteries can be used without particular limitations. For instance, an oxide comprising lithium and at least one species of transition metal as constituent metals (a lithium transition metal oxide) can be preferably used. For example, can be used a lithium transition metal oxide having a layered or spinel crystal structure.

Other preferable examples of a material usable as the positive electrode active material include olivine-type lithium phosphates as well as polyanionic materials For example, the olivine-type lithium phosphate can be an olivine-type lithium phosphate (LiFePO$_4$, LiMnPO$_4$, etc.) represented by a general formula LiMPO$_4$ (M is at least one species among Co, Ni, Mn and Fe).

The positive electrode active material according to a preferable embodiment comprises a lithium transition metal oxide having a layered crystal structure (typically, a layered rock-salt structure belonging to the hexagonal system). The lithium transition metal oxide preferably comprises at least one species among Ni, Co and Mn. For example, a positive electrode active material having a composition comprising at least Ni can be preferably used. For instance, a preferable positive electrode active material comprises 10% by mole or more (preferably 20% by mole or more) Ni, with the total amount of metals excluding lithium being 100% by mole.

A preferable example of the lithium transition metal oxide is a lithium transition metal oxide comprising each of Ni, Co and Mn (or "LiNiCoMn oxide" hereinafter). For example, by the number of atoms, a preferable LiNiCoMn oxide comprises Ni, Co and Mn in amounts all exceeding 0 up to 0.7 (more preferably exceeding 0.1 up to 0.6, typically exceeding 0.3 up to 0.5), with the total amount of Ni, Co and Mn being 1. In a particularly preferable LiNiCoMn oxide, the amounts of Ni, Co and Mn are approximately the same.

The positive electrode active material comprises, in addition to the at least one species among Ni, Co and Mn, one, two or more other elements as supplemental constituent elements (additional elements). Preferable examples of such additional elements include W, Cr, Mo, Ti, Zr, Nb, V, Al, Mg, Ca, Na, Fe, Cu, Zn, Si, Ga, In, Sn, B and F.

The positive electrode active material according to a preferable embodiment comprises, as the additional element, at least one species of metal selected from W, Cr and Mo. A particularly preferable positive electrode active material has a composition comprising at least W as the additional element. A battery using such a positive electrode active material may have a reduced reaction resistance as well as excellent input and output properties.

The additional element (e.g. W) content in the positive electrode active material can be, for instance, 0.001 to 5% by mole, with the total number of moles of Ni, Co and Mn being 100% by mole. It is usually suitably 0.01 to 3% by mole or preferably 0.05 to 1% by mole (more preferably 0.1 to 1% by mole, e.g. 0.2 to 1% by mole).

The positive electrode active material in the art disclosed herein can be formed, for instance, by mixing a suitable lithium compound with a hydroxide (precursor) prepared by a wet method, followed by calcining the resultant at a prescribed temperature. For the positive electrode active material comprising an additional element, a hydroxide comprising the additional element should be prepared. According to this method, can be obtained a positive electrode active material such that localization is prevented in the additional element distribution in the positive electrode active material.

The positive electrode active material preferably has a composition comprising an excess amount of Li relative to the total amount $m_{Mall}$ of all metals contained in the positive electrode active material excluding Li (i.e. $1.00 < m_{Li}/m_{Mall}$). According to such a positive electrode active material having a composition comprising an excess of Li relative to $m_{Mall}$, can be obtained a lithium-ion secondary battery of higher performance (e.g. excellent output performance). In a preferable embodiment, $m_{Li}/m_{Mall}$ is 1.05 or higher, more preferably 1.10 or higher (i.e. $1.10 \leq m_{Li}/m_{Mall}$). The upper limit of $m_{Li}/m_{Mall}$ is not particularly limited. It is usually preferable that $m_{Li}/m_{Mall}$ is 1.4 or smaller (preferably 1.3 or smaller, e.g. 1.2 or smaller).

The positive electrode active material preferably has an average particle diameter in a range of, for instance, 2 μm to 10 μm (more preferably 3 μm to 8 μm).

The BET specific surface area of the positive electrode active material disclosed herein is preferably about 0.3 m²/g or greater, more preferably 0.5 m²/g or greater, or yet more preferably 0.8 m²/g or greater. The BET specific surface area can be, for instance, about 3.0 m²/g or less (e.g. 2.0 m²/g or less), 1.7 m²/g or less, or even 1.5 m²/g or less. The positive electrode active material according to a preferable embodiment has a BET specific surface area in a range of about 0.5 m²/g to 2.0 m²/g.

The positive electrode active material in the art disclosed herein may be particles having a porous structure or hollow structure. Herein, the porous structure refers to a structure (sponge-like structure) where solid portions and void spaces are present mixed together throughout a particle. Typical examples of a positive electrode active material having a porous structure is a positive electrode active material (typically present in a form of secondary particles formed of aggregated primary particles) obtained by a so-called spray calcination method (or sometimes called a spray dry preparation method). The hollow structure refers to a structure having a shell portion and a hollow portion (void space) therein. With respect to these hollow particles, a solid portion is localized in the shell, making them structure-wise clearly distinctive from porous particles in that a clearly sizable space is formed in the hollow portion. In the hollow particles, the sizable space in the hollow portion is typically a space larger than a space present among primary particles (among adjacent primary particles calcined closely to each other).

The shell portion preferably has a through hole connecting the particle's exterior and the hollow portion. Hereinafter, a hollow structure having the through hole in the shell portion is referred to as a "perforated hollow structure". As the positive electrode active material in the art disclosed herein, particles having such a perforated hollow structure (perforated hollow active material particles) can be preferably used. The thickness of the shell portion is usually suitably 3.0 μm or smaller, preferably 2.5 μm or smaller (typically 2.2 μm or smaller, more preferably 2.0 μm or smaller, e.g. 1.5 μm or smaller). The lower limit of the shell portion's thickness is not particularly limited. From the standpoint of the mechanical strength and facile preparation, it is usually suitably 0.1 μm or larger, or preferably 0.2 μm or larger.

The perforated hollow active material particles have a particle hollow fraction of typically 5% or higher, or usually preferably 10% or higher (e.g. 15% or higher). Herein, the term "particle hollow fraction" refers to a volume ratio of hollow portions in the apparent volume of perforated hollow active material particles. This fraction can be determined based on a cross-sectional SEM image of the active material particles. The particle hollow fraction can be 20% or higher (typically 23% or higher, preferably 30% or higher). Preferable perforated hollow active material particles have a particle hollow fraction of 75% or lower (e.g. 70% or lower).

As the perforated hollow active material particles, can be preferably used particles having an average hardness of about 0.5 MPa or higher (typically 1.0 MPa or higher, e.g. 2.0 MPa to 10 MPa). Herein, the term "average hardness" refers to a value obtained by dynamic micro hardness measurement carried out using a flat diamond indenter of 50 μm diameter at a loading rate of 0.5 mN/sec to 3 mN/sec. For such dynamic micro hardness measurement, for instance, a micro hardness meter under model number "MCT-W500" available from Shimadzu Corporation can be used.

As for the material of perforated hollow active material particles, a lithium transition metal oxide (typically a layered lithium transition metal oxide) is preferable. From the standpoint of facile preparation, a lithium transition metal oxide comprising at least Ni is particularly preferable. A preferable example of the lithium transition metal oxide is a LiNiCoMn oxide.

Active material particles having such a perforated hollow structure can be preferably produced, for instance, by a method comprising: a starting-hydroxide-forming step where a transition metal hydroxide (precursor hydroxide) is precipitated out from an aqueous transition metal solution, a mixing step where the precursor hydroxide and a lithium compound are mixed to prepare an uncalcined mixture, and a calcining step where the uncalcined mixture is calcined. Herein, the starting-hydroxide-forming step typically comprises a nucleation stage where the transition metal hydroxide is precipitated out from the aqueous solution and a particle growing stage where the precipitated transition metal hydroxide is allowed to grow. The particle growing stage is preferably carried out while controlling the ammonia concentration in the solution (e.g. controlling it to stay at or below a certain value).

In the nucleation stage, it is preferable to allow a large number of nuclei to precipitate out from the mixture in a short time (e.g. approximately at the same instance). To suitably achieve such a precipitation form, the nucleation stage is preferably carried out at pH 12.0 or higher (typically pH 12.0 to 14.0, e.g. pH 12.2 to 13.0). In this description, the pH value refers to a pH value at a standardized liquid temperature of 25° C. When the nucleation stage is carried out in a solution containing ammonia, the ammonia concentration is not particularly limited. It is usually suitably 25 g/L or lower (3 g/L to 25 g/L, preferably 10 g/L to 25 g/L).

In the particle growing stage, the transition metal hydroxide nuclei precipitated out in the nucleation stage are allowed to grow under a basic condition in a pH range preferably lower than the nucleation stage. For example, particles can be well grown at a pH below 12.0 (typically at or above pH 10.0, but below 12.0; preferably at or above pH 10.0, but 11.8 or below; e.g. pH 11.0 or above, but 11.8 or below). The particle growing stage is preferably carried out in a solution containing ammonia. The ammonia concentration in the solution can be, for instance, 25 g/L or lower, usually suitably 20 g/L or lower, preferably 15 g/L or lower, or more preferably 10 g/L or lower, for example, 8 g/L or lower. The lower limit of ammonia concentration in the solution is not particularly limited while it is usually suitably about 1 g/L or higher (preferably 3 g/L or higher). In the particle growing stage, it is preferable to control the ammonia concentration in the solution at a concentration below the ammonia concentration in the nucleation stage (typically at a concentration of 75% or lower, e.g. 50% or lower).

Throughout the nucleation stage and particle growing stage, the temperature of the reaction mixture is preferably in a range of about 20° C. to 60° C. (e.g. 30° C. to 50° C.). With respect to the atmosphere in the reaction mixture and reaction vessel, it is preferable to maintain a non-oxidizing atmosphere (e.g. a non-oxidizing atmosphere approximately at an oxygen concentration of 20% or lower, or preferably 10% or lower) throughout the nucleation stage and particle growing stage.

By mixing the transition metal hydroxide (precursor hydroxide) thus obtained with a lithium compound (lithium source) such as lithium carbonate, lithium hydroxide, etc., and calcining the mixture, active material particles having a perforated hollow structure can be obtained. The calcining is typically carried out in an oxidizing atmosphere (e.g. in the air). The calcining temperature can be, for instance, 700° C. to 1100° C. Calcining is preferably carried out so that the maximum calcining temperature is 800° C. or higher (preferably 800° C. to 1100° C., e.g. 800° C. to 1050° C.).

<<Separator>>

As the separator placed between the positive electrode sheet and negative electrode sheet, can be used a separator similar to those generally used in the pertaining field without particular limitations. For example, can be used porous sheets formed of resins such as polyethylene (PE), polypropylene (PP), polyester, cellulose, polyamide, etc.; non-woven fabrics formed of these resins; and the like. Preferable examples include a mono-layer or multi-layer porous resin sheet primarily constituted with one, two or more species of polyolefin resin. As the multi-layer porous resin sheet, can be preferably used, for instance, a PE sheet, PP sheet, three-layer sheet in which a PP layer is layered on each side of a PE layer (having a PP/PE/PP structure). The porous resin sheet preferably has a thickness of, for instance, about 10 μm to 40 μm.

The separator in the art disclosed herein may be constituted as a heat-resistant separator comprising a porous sheet as described above, an organic porous layer formed of a non-woven fabric, etc., and an inorganic porous layer (heat-resistant layer) retained on one or each face (typically one face) of the organic porous layer. The heat-resistant layer can have a thickness of, for instance, about 2 μm to 10 μm.

The heat-resistant layer may comprise, for instance, an inorganic filler and a binder. For example, can be preferably used inorganic fillers such as alumina, boehmite (an alumina monohydrate represented by a compositional formula $Al_2O_3 \cdot H_2O$), silica, titania, cakia, magnesia, zirconia, boron nitride, aluminum nitride, etc. As the form of the inorganic filler, powder forms such as particular forms, fiber forms, flake forms, etc., are preferable. The inorganic filler powder may have an average particle diameter of, for instance, about 0.05 μm to 2 μm (typically 0.1 μm to 2 μm, preferably 0.4 μm to 0.7 μm). Alternatively, can be used an inorganic filler in a flake form (plate form) having an average particle diameter of 0.5 μm to 5 μm. As such a flake-form inorganic filler, can be preferably used a filler having an average thickness of, for instance, 0.02 μm to 0.7 μm.

<<Capacity Ratio of Negative Electrode to Positive Electrode>>

Although not particularly limited, the non-aqueous electrolyte secondary battery disclosed herein is preferably adjusted so that the opposite capacity ratio ($C_N/C_P$) determined as a ratio of the negative electrode's initial charge capacity ($C_N$) to the positive electrode's initial charge capacity ($C_P$) has a value of 1.0 to 2.1. The opposite capacity ratio ($C_N/C_P$) has a value of preferably 1.2 to 2.0 or more preferably 1.6 to 2.0. Depending on the conditions of use (e.g. upon rapid charging, etc.), too small a $C_N/C_P$ value may lead to issues such as likely precipitation of lithium metal. On the other hand, too large a $C_N/C_P$ value may lead to a likely decrease in the energy density of the battery While several worked examples related to the present invention are described below, the present invention is not limited to those illustrated in such specific examples.

EXAMPLE 1

(Preparation of Positive Electrode Active Material)

In water, were dissolved nickel sulfate ($NiSO_4$), cobalt sulfate ($CoSO_4$), manganese sulfate ($MnSO_4$) and zirconium sulfate at a Ni:Co:Mn molar ratio of 1:1:1 to a total concentration of Ni, Co, Mn and Zr of 1.8 mol/L to prepare an aqueous solution $aq_4$. Ammonium paratungstate ($5(NH_4)_2O \cdot 12\ WO_3$) was dissolved in water to prepare an aqueous solution aq$_B$ (aqueous W solution) having a W concentration of 0.1 mol/L. To a reaction vessel equipped with a stirrer and nitrogen inlet, were added suitable amounts of 25% (by mass) aqueous sodium hydroxide solution and 25% (by mass) aqueous ammonia water to prepare a basic aqueous solution at pH 12.0 having a liquid-phase ammonia concentration of 20 g/L.

While the aqueous solution aq$_A$, aqueous solution aq$_B$, 25% aqueous sodium hydroxide solution and 25% aqueous ammonia water were supplied to the basic aqueous solution at constant rates to maintain the reaction mixture at or above pH 12.0 (specifically at pH 12.0 to 14.0) and also at 20 g/L ammonia concentration, a hydroxide was crystallized out from the reaction mixture (nucleation stage). Subsequently, while the supply rates of the respective solutions to the reaction vessel were adjusted to adjust the pH of the reaction mixture below 12.0 (specifically at pH 10.5 to 11.9) to control the liquid-phase ammonia concentration to be at a prescribed concentration in a range of 1 g/L to 10 g/L, the particle-growing reaction of the nuclei produced above was carried out (particle growing stage). The product was removed from the reaction vessel, washed with water and allowed to dry to obtain a composite hydroxide (precursor hydroxide) having a (Ni+Co+Mn):Zr:W molar ratio of 100: 0.2:0.5. The precursor hydroxide was heated in the air at 150° C. for 12 hours.

The precursor hydroxide and Li$_2$CO$_3$ (lithium source) were then mixed at a Li:(Ni+Co+Mn) molar ratio of 1.14:1 (mixing step). The resulting uncalcined mixture was calcined in the air at 800° C. to 950° C. for 5 hours to 15 hours. Subsequently, the calcined product was cooled, crushed and sieved. A positive electrode active material having an average composition represented by Li$_{1.14}$Ni$_{0.34}$Co$_{0.33}$Mn$_{0.33}$Zr$_{0.002}$W$_{b\ 0.005}$O$_2$ and having a perforated hollow structure was thus obtained.

The positive electrode active material had an average particle diameter (median diameter D50) of 3 μm to 8 pm, a specific surface area of 0.5 m$^2$/g to 1.9 m$^2$/g and an average hardness of 0.5 MPa to 10 MPa. Cross-sectional SEM observation of the positive electrode active material showed that it was present in a form of secondary particles formed of aggregated primary particles, comprising distinctive shell portions and hollow portions. It was confirmed that through holes were formed in the shell portions and the shell portions were compactly calcined in the region excluding the through holes. The shell portions had an average thickness of about 1.5 μm and an approximately 23.7% hollow fraction determined from the cross-sectional surface area ratio.

(Fabrication of Positive Electrode Sheet)

Were mixed the positive electrode active material prepared above, AB (conductive material), PVDF (binder) with N-methylpyrrolidone (NMP) at a mass ratio of these materials of 90:8:2 to prepare a slurry composition for forming positive electrode active material layers. The composition was applied to each face of a long sheet of 15 μm thick aluminum foil (positive current collector). The coating amount was adjusted so that the coating amounts for both faces were about the same and the combined coating amount for both faces was about 11.3 mg/cm$^2$ (after dried, based on non-volatiles). After the composition was dried, the resultant was pressed with a press roller to adjust the density of the positive electrode active material layer to 1.8 g/cm$^3$ to 2.4 g/cm$^3$. This was cut to a 3000 mm long sheet having a 98 mm wide coating band (referring to a region on which the active material layer was formed; the same applies hereinafter) along the length direction to fabricate a positive electrode sheet.

(Fabrication of Negative Electrode Sheet)

As the negative electrode active material, was used a particulate carbon having a structure such that surfaces of graphite particles had been coated with amorphous carbon. More specifically, natural graphite powder and pitch were mixed so that the pitch was adsorbed on the graphite powder surfaces (the natural graphite powder to pitch mass ratio was 96:4), and the mixture was calcined under an inert gas atmosphere at 1000° C. to 1300° C. for 10 hours and then sieved to obtain a negative electrode active material having an average particle diameter (D50) of 5 μm to 20 μm and a specific surface area of 3.0 m$^2$/g to 6.0 m$^2$/g. The negative electrode active material, SBR and CMC were mixed with ion-exchanged water at a mass ratio of these materials of 98.6:0.7:0.7 to prepare a slurry composition for forming negative electrode active material layers. The composition was applied to each face of a long sheet of 10 μm thick copper foil (negative current collector). The coating amount was adjusted so that the coating amounts for both faces were about the same and the combined coating amount for both faces was about 7.3 mg/cm$^2$ (after dried, based on non-volatiles). After dried, the resultant was pressed with a press roller to adjust the density of the negative electrode active material layer to 0.9 g/cm$^3$ to 1.3 g/cm$^3$. This was cut to a 3200 mm long sheet having a 102 mm wide coating band along the length direction to fabricate a negative electrode sheet.

(Fabrication of Heat-Resistant Separator)

Were mixed alumina powder as an inorganic filler, an acrylic binder and CMC as a thickening agent with ion-exchanged water as a solvent to an Al$_2$O$_3$:binder:CMC ratio of 98:1.3:0.7. The resulting slurry was applied to one face of a 20 μm thick polyethylene mono-layer porous sheet and allowed to dry at 70° C. to form an inorganic porous layer, whereby a heat-resistant separator was obtained. The coating amount (coating weight) of the slurry was adjusted to 0.7 mg/cm$^2$ based on non-volatiles. After dried, the inorganic porous material layer had a thickness of 4 μm.

(Construction of Battery Cell)

The positive electrode sheet and negative electrode sheet were layered with two sheets of the heat-resistant separator placed in between. The two sheets of the heat-resistant separator were placed so that their inorganic porous layers faced the negative electrode active material layers of the negative electrode, respectively. The resultant was wound to 29 turns in the length direction. The wound body was laterally compressed and flattened to fabricate a flat wound electrode body.

The wound electrode body was placed along with a non-aqueous electrolyte solution in a box-shaped battery case and the opening of the battery case was sealed airtight. As the non-aqueous electrolyte solutions, were used electrolyte solutions containing LiPF$_6$ as the supporting salt at approximately 1 mol/L concentration in a mixed solvent of EC, EMC and DMC at a 3:3:4 volume ratio, and further containing lithium bis(oxalato)borate (LiBOB) at concentrations (mol/kg) shown in Table 1. Battery cells A1 to A9 were thus constructed. These battery cells had been adjusted to have initial capacity ratio values ($C_N/C_P$) of 1.5 to 1.9.

(Conditioning)

Each battery cell constructed as described above was subjected to conditioning at 25° C. according to the following steps 1 and 2:

[Step 1] Subjecting to constant-current charging at 1.5 C to 4.1 V, followed by 2 hour constant-voltage charging, followed by a 10 second break.

[Step 2] Subjecting to constant-current discharging at 1 C to 3.0 V, followed by 2 hour constant-voltage discharging, followed by a 10 second break.

Battery cell samples A1 to A9 were found to have rated capacities (initial capacities) of about 3.8 Ah. The capacities were rated by the following procedure.

(Capacity Rating)

Each conditioned battery cell was subjected to capacity rating at a temperature of 25° C. over a voltage range from 3.0 V to 4.1 V according to the following steps 1 to 3.

[Step 1] Subjecting to constant-current discharging at 1 C to 3.0 V, followed by 2 hour constant-voltage discharging, followed by a 10 second break.

[Step 2] Subjecting to constant-current charging at 1 C to 4.1 V, followed by 2.5 hour constant-voltage charging, followed by a 10 second break.

[Step 3] Subjecting to constant-current discharging at 1 C to 3.0 V, followed by 2 hour constant-voltage discharging, followed by a 10 second break.

The discharge capacity (CCCV discharge capacity) by the constant-current discharging and constant-voltage discharging in Step 3 was recorded as the rated capacity.

(Evaluation of Initial Negative Electrode Resistance)

The negative electrode resistance of each battery cell was evaluated by Li precipitation test carried out in the following procedure.

In particular, each conditioned battery cell was adjusted to 80% SOC and then subjected at 0° C. to 1000 cycles of pulse charging and discharging with a single cycle comprising the following (I) to (IV). During this time, every 20 cycles, each battery cell was adjusted to 80% SOC.

(I) Subjecting to constant-current charging at 20 C for five seconds.

(II) Subjecting to a 10 second break.

(III) Subjecting to constant-current discharging at 20 C for five seconds.

(IV) Subjecting to a 10 second break.

After the 1000 cycles of pulse charging and discharging, the battery cell was disassembled, and the surfaces of the negative electrode active material layers were visually inspected and assessed for the presence of Li precipitation. By this, in a battery cell with Li precipitation found on the negative electrode active material surface, the negative electrode active material can be evaluated to have a poorer ability to accept Li ions upon high-rate, low temperature pulse charging and discharging as described above, that is, the negative electrode resistance is high. The results are indicated as ○ (low negative electrode resistance, highly resistant to Li precipitation) when no Li precipitation was observed and as x (high negative electrode resistance, poorly resistant to Li precipitation) when some Li precipitation was observed, in "initial negative electrode resistance" column in Table 1.

(Evaluation of Negative Electrode Resistance After Stored)

Each conditioned battery cell was adjusted to 80% SOC (battery voltage 3.86 V) and stored in an environment at 60° C. for 300 days (storage endurance test). With respect to each battery cell after the storage endurance test, the negative electrode resistance was evaluated by the same Li precipitation test as described above. The results are shown in "negative electrode resistance after stored" column in Table 1.

TABLE 1

| | Electrolyte | Evaluations | |
|---|---|---|---|
| Cell | solution $Mc_B$ [mol/kg] | Initial negative electrode resistance | Negative electrode resistance after stored |
| A1 | 0 | ○ | x |
| A2 | 0.005 | ○ | x |
| A3 | 0.01 | ○ | x |
| A4 | 0.015 | x | ○ |
| A5 | 0.02 | x | ○ |
| A6 | 0.025 | x | ○ |
| A7 | 0.03 | x | ○ |
| A8 | 0.04 | x | ○ |
| A9 | 0.05 | x | ○ |

$Mc_B$: Concentration of oxalatoborate-based compound in non-aqueous electrolyte solution used As shown in Table 1, precipitation of Li was observed in A1 to A3 using non-aqueous electrolyte solutions having oxalatoborate-based compound (LiBOB herein) concentrations $Mc_B$ of 0.01 mol/kg or lower, in the Li precipitation test after storage endurance test. This indicates that SEI layer had grown thick on the negative electrode active material by the storage endurance test, thereby increasing the negative electrode resistance. On the other hand, with respect to A4 to A7 using non-aqueous electrolyte solutions at $Mc_B$ above 0.01 mol/kg, while they showed good Li precipitation resistance after the storage endurance test, their initial Li precipitation resistance was poor. This suggests that in A4 to A7, the OB layers formed by the conditioning on the negative electrodes were denser than those of A1 to A3 and these OB layers increased the initial negative electrode resistance.

EXAMPLE 2

In this example, were used non-aqueous electrolyte solutions containing $LiPF_6$ at about 1 mol/L concentration in a mixed solvent of EC, EMC and DMC at a 3:3:4 volume ratio and further containing LiBOB at concentrations (mol/kg) shown in Table 2. Otherwise, in the same manner as cells A1 to A9, battery cells B1 to B14 were constructed.

These battery cells were conditioned in the same manner as Example 1.

(Modification Treatment)

Each conditioned battery cell was subjected to a treatment to modify the OB layer formed by the conditioning. In particular, the respective battery cells were adjusted to 90% SOC and stored under the modification conditions shown in Table 2, respectively. For instance, with respect to battery cell B11, after adjusted to 90% SOC (battery voltage 3.97 V), the cell was stored in an environment at 75° C. for 35 hours.

(Negative Electrode Resistance Test)

With respect to each modified battery cell, the same Li precipitation test as Example 1 was carried out to assess the negative electrode resistance. The results are shown in "initial negative electrode resistance after modification" column in Table 2. Battery cells B1 to B14 before the modification treatment were also tested for the negative electrode resistance in the same manner. The results are shown in "initial negative electrode resistance before modification" column in Table 2.

(Composition of OB Layer)

Each modified battery cell was disassembled and the negative electrode active material layer was subjected to ICP emission analysis to determine the number of moles $m_B$ of boron (B) contained per unit surface area of negative electrode active material layer ($\mu$mol/cm$^2$). By ion chromatography, was also determined the number of moles $m_A$ of oxalate ions contained per unit surface area of negative electrode active material layer ($\mu$mol/cm$^2$). With respect to each battery cell, from the $m_A$ and $m_B$ values, was determined the ratio ($m_B/m_A$) of number of moles $m_B$ of boron to number of moles $m_A$ of oxalate ions. These results are shown in Table 2. In the table, the symbol "-" means either unmeasured or indeterminable.

In particular, the number of moles $m_B$ of boron contained per unit surface area of negative electrode active material layer was quantitated under the following conditions:

1) The battery was discharged to 3 V and disassembled to remove the negative electrode sheet.
2) The negative electrode sheet was immersed in and washed with ethyl methyl carbonate (EMC).
3) A length (102 mm×50 mm) of the negative electrode sheet corresponding to about half a turn (0.5 turn) of the wound body was analyzed.
4) As the analyzer, was used an ICP emission analyzer (ICPS8100) available from Shimadzu Corporation.
5) The amount ($\mu$g) of boron obtained was converted to the number of moles and divided by the surface area of the analyzed negative electrode active material layer to determine the number of moles $m_B$ of boron.

In addition, the number of moles $m_A$ of oxalate ions contained per unit surface area of negative electrode active material layer was specifically quantitated under the following conditions:

1) The battery was discharged to 3 V and disassembled to remove the negative electrode sheet.
2) The negative electrode sheet was immersed in and washed with EMC.
3) The negative electrode sheet was stamped out to a prescribed surface area (to 40 mm diameter herein).
4) As the analyzer, was used an ion chromatography system (ICS-3000) available from Nippon Dionex K.K.
5) The amount ($\mu$g) of oxalate ions obtained was converted to the number of moles and divided by the surface area of the analyzed negative electrode active material layer to determine the number of moles $m_A$ of oxalate ions.

As shown in Table 2, among B2 to B14 using non-aqueous electrolyte solutions having $Mc_B$ above 0.01 mol/kg, in B5 to B14, modification of their OB layers under the conditions shown in Table 2 decreased the amounts of oxalate ions sufficiently. As a result, the negative electrode resistance was reduced, leading to good Li precipitation resistance. On the contrary, in B2 and B3, as evident from the $m_A$ and $m_B/m_A$ ratio values, effects of the OB layer modification under the conditions shown in Table 2 were insufficient. In B4 modified at 85° C., the positive electrode active material suffered degradation (a structural change in the active material surface, e.g. decreased Ni valence, etc.), leading to the increase of the positive electrode resistance, and thereby giving rise to an issue of increased battery resistance. When battery cells B1 to B14 after modification were subjected to the same storage endurance test as Example 1 and then to Li precipitation test, while no Li precipitation was observed in B2 to B14, Li precipitation was observed in B1.

EXAMPLE 3

In this example, was used a non-aqueous electrolyte solution containing LiPF$_6$ at about 1 mol/L concentration in a mixed solvent of EC, EMC and DMC at a 3:3:4 volume ratio and further containing LiBOB at 0.025 mol/kg concentration. Otherwise, in the same manner as cells A1 to A9, battery cells C1 to C4 were constructed.

These battery cells were conditioned in the same manner as Example 1.

The respective conditioned battery cells were adjusted to 90% SOC (battery voltage 3.97 V) and stored under the modification conditions shown in Table 3, respectively.

(Evaluation of Amount of Mn Precipitation)

Each modified battery cell was discharged to 3 V and disassembled. With respect to a portion of the negative electrode sheet located at the outermost circumference of the wound electrode body, the negative electrode active material layer was subjected to ICP emission analysis to assess the amount of Mn present. Since the positive electrode active material was the only material containing Mn among the materials used for constructing the battery cells, any Mn present in the negative electrodes after modification was

TABLE 2

| Cell | Electrolyte solution Mc$_B$ [mol/kg] | Before modification Initial negative electrode resistance | Modification conditions Temperature (° C.) | Modification conditions Time (hr) | After modification $m_B$ ($\mu$mol/cm$^2$) | After modification $m_A$ ($\mu$mol/cm$^2$) | After modification $m_B/m_A$ | After modification Initial negative electrode resistance |
|---|---|---|---|---|---|---|---|---|
| B1 | 0.01 | ○ | 45 | 40 | 0.13 | 0.07 | 1.9 | ○ |
| B2 | 0.015 | x | 45 | 40 | 0.24 | 0.12 | 2.0 | x |
| B3 | 0.025 | x | 45 | 50 | 0.32 | 0.15 | 2.1 | x |
| B4 | 0.015 | x | 85 | 20 | — | — | — | x |
| B5 | 0.015 | x | 60 | 40 | 0.25 | 0.06 | 4.2 | ○ |
| B6 | 0.015 | x | 75 | 20 | 0.25 | 0.05 | 5 | ○ |
| B7 | 0.02 | x | 60 | 150 | 0.32 | 0.04 | 8 | ○ |
| B8 | 0.02 | x | 75 | 25 | — | 0.04 | — | ○ |
| B9 | 0.025 | x | 60 | 170 | 0.36 | 0.04 | 9 | ○ |
| B10 | 0.025 | x | 75 | 30 | — | 0.035 | — | ○ |
| B11 | 0.03 | x | 75 | 35 | 0.41 | 0.045 | 9.1 | ○ |
| B12 | 0.04 | x | 80 | 25 | 0.46 | 0.04 | 11.5 | ○ |
| B13 | 0.05 | x | 75 | 40 | 0.52 | 0.06 | 8.7 | ○ |
| B14 | 0.1 | x | 60 | 200 | 0.88 | 0.10 | 8.8 | ○ |

Mc$_B$: Concentration of oxalatoborate-based compound in non-aqueous electrolyte solution used
$m_B$: Number of moles of boron contained per cm$^2$ of negative electrode active material layer
$m_A$: Number of moles of oxalate ions contained per cm$^2$ of negative electrode active material layer considered to have been dissolved out from the positive electrode active material and precipitated out on the negative electrodes. The amount (by mass) of Mn present was determined as a percentage of the mass of Mn to the mass of the negative electrode active material contained in the analyzed portion. The results are shown in "amount of Mn precipitation" column in Table 3. The level of the amount of Mn precipitation presumably reflects the amount of Mn dissolved out from the positive electrode active material. In the table, ND indicates that the amount of Mn precipitation was at or below the detection limit (0.001% by weight herein).

TABLE 3

| Cell | Electrolyte solution $Mc_B$ [mol/kg] | Modification conditions Temperature (° C.) | Time (hr) | Mn dissolved out | Amount of Mn precipitation (wt %) |
|---|---|---|---|---|---|
| C1 | 0.025 | 50 | 30 | none | ND |
| C2 | 0.025 | 60 | 30 | present | 0.0015 |
| C3 | 0.025 | 70 | 30 | present | 0.004 |
| C4 | 0.025 | 80 | 30 | present | 0.008 |

$Mc_B$: Concentration of oxalatoborate-based compound in non-aqueous electrolyte solution used
Amount of Mn precipitation: mass of Mn in negative electrode/mass of negative electrode active material
ND: at or below detection limit (≤0.001 wt % herein)

As shown in Table 3, when modified at 60° C. or higher, Mn dissolution was detected and the amount dissolved out further increased with increasing temperature.

EXAMPLE 4

In this example, were used non-aqueous electrolyte solutions containing $LiPF_6$ at about 1 mol/L concentration in a mixed solvent of EC, EMC and DMC at a 3:3:4 volume ratio and further containing LiBOB and lithium difluorophosphate ($LiPO_2F_2$) at concentrations (mol/kg) shown in Table 4. Otherwise, in the same manner as cells A1 to A9, battery cells D1 to D7 were constructed.

These battery cells were conditioned in the same manner as Example 1.

The respective conditioned battery cells were adjusted to 90% SOC and modified under the modification conditions shown in Table 4, respectively.

With respect to the negative electrode of each modified battery cell, the amount of Mn precipitation was determined in the same manner as Example 3.

(Composition of DFP Layer)

Each modified battery cell was discharged to 3 V and disassembled. The positive electrode active material layer was subjected to ion chromatography to assess the number of moles mp of difluorophosphate ions contained per unit surface area of positive electrode active material layer ($\mu$mol/cm$^2$). These results are shown in Table 4.

In particular, the number of moles mp of difluorophosphate ions contained per unit surface area of positive electrode active material layer was quantitated under the following conditions:

1) The battery was discharged to 3 V and disassembled to remove the positive electrode sheet.

2) The positive electrode sheet was immersed in and washed with EMC.

3) The positive electrode sheet was stamped out to a prescribed surface area (to 40 mm diameter herein).

4) As the analyzer, was used an ion chromatography system (ICS-3000) available from Nippon Dionex K.K.

5) The amount ($\mu$g) of difluorophosphate ions obtained was converted to the number of moles and divided by the surface area of the analyzed positive electrode active material layer to determine the number of moles mp of difluorophosphate ions.

TABLE 4

| Cell | Electrolyte solution $Mc_B$ [mol/kg] | $Mc_P$ [mol/kg] | $Mc_P/Mc_B$ | Modification conditions Temperature (° C.) | Time (hr) | Positive electrode $m_P$ ($\mu$mol/cm$^2$) | Negative electrode Amount of Mn precipitation (wt %) |
|---|---|---|---|---|---|---|---|
| D1 | 0.025 | 0 | 0 | 80 | 30 | — | 0.008 |
| D2 | 0.025 | 0.01 | 0.4 | 80 | 30 | 0.0012 | 0.006 |
| D3 | 0.025 | 0.02 | 0.8 | 80 | 30 | 0.0014 | 0.003 |
| D4 | 0.025 | 0.03 | 1.2 | 80 | 30 | 0.0018 | 0.0015 |
| D5 | 0.025 | 0.05 | 2.0 | 80 | 30 | 0.0025 | ND |
| D6 | 0.025 | 0.08 | 3.2 | 80 | 30 | 0.0054 | ND |
| D7 | 0.025 | 0.10 | 4.0 | 80 | 30 | 0.0082 | ND |

$Mc_B$: Concentration of oxalatoborate-based compound in non-aqueous electrolyte solution used
$Mc_P$: Concentration of difluorophosphate salt in non-aqueous electrolyte solution used
Amount of Mn precipitation: mass of Mn in negative electrode/mass of negative electrode active material
$m_P$: Number of moles of difluorophosphate ions contained per cm$^2$ of positive electrode active material layer
ND: at or below detection limit (≤0.001 wt % herein)

As shown in Table 4, with respect to D2 to D7 using non-aqueous electrolyte solutions containing $LiPO_2F_2$ in addition to LiBOB, dissolution of Mn was suppressed as compared to D1 using a non-aqueous electrolyte solution free of $LiPO_2F_2$. In D5 to D7 having DFP layers with $m_P$ of 0.002 mol/cm$^2$ or greater, particularly great Mn dissolution-preventing effects were obtained.

Although the present invention has been described in detail above, these embodiments are merely for illustrations. The invention disclosed herein includes various modifications and changes made to the specific embodiments illustrated above.

REFERENCE SIGNS LIST 1 vehicle
10 positive electrode sheet (positive electrode)
10A positive electrode active material layer-free portion
12 positive current collector
14 positive electrode active material layer
142 positive electrode active material
144 DFP layer 20 negative electrode sheet (negative electrode)
20A negative electrode active material layer-free portion
22 negative current collector
24 negative electrode active material layer
242 negative electrode active material
244 OB layer
30 separator sheet (heat-resistant separator)
32 organic porous material layer (porous resin sheet)
32A first surface (negative electrode-facing surface)
34 inorganic porous material layer
50 battery case
52 main casing
54 lid
72 positive terminal
74 negative terminal
76 positive current collector plate
78 negative current collector plate
80 wound electrode body (electrode body)
90 non-aqueous electrolyte solution
100 lithium-ion secondary battery (non-aqueous electrolyte secondary battery)

The invention claimed is:

1. A method for producing a non-aqueous electrolyte secondary battery, the method comprising:
constructing a battery cell that comprises a positive electrode comprising a positive electrode active material, a negative electrode comprising a negative electrode active material, and a non-aqueous electrolyte solution comprising a non-aqueous solvent, an oxalatoborate-based compound, and a difluorophosphate salt, wherein the concentration of the oxalatoborate-based compound in the non-aqueous electrolyte solution is 0.015 mol/kg to 0.05 mol/kg;
charging the battery cell to form, on the negative electrode, a layer derived from the oxalatoborate-based compound with the layer comprising boron (B) and oxalate ions; and
subjecting the battery cell to an aging treatment in which the battery cell is stored at or above a temperature of 60 ° C. in a state satisfying at least either a state of charge (SOC) not lower than 82% of a voltage not lower than 3.9 V so as to a modification treatment to increase the ratio ($m_B/m_A$ ratio) of number of moles $m_B$ of boron to number of moles $m_A$ of oxalate ions in the layer to the value of 3.0 to 15.

2. The non-aqueous electrolyte secondary battery production method according to claim 1, wherein the non-aqueous electrolyte solution used for constructing the battery cell comprises the difluorophosphate salt at a concentration of 0.05 mol/kg to 1.0 mol/kg.

3. The non-aqueous electrolyte secondary battery production method according to claim 1, such that in the non-aqueous electrolyte solution used for constructing the battery cell, the difluorophosphate salt concentration $Mc_p$ is 1.5 times to 5 times the oxalatoborate-based compound concentration $Mc_B$.

4. The non-aqueous electrolyte secondary battery production method according to claim 1, wherein the positive electrode active material is a lithium transition metal oxide comprising Mn as a constituent metal.

* * * * *